United States Patent
Good

(10) Patent No.: US 10,298,387 B1
(45) Date of Patent: May 21, 2019

(54) MEDIA STREAM INTERCEPTION AND SIMULCAST

(71) Applicant: WOWZA MEDIA SYSTEMS, LLC, Golden, CO (US)

(72) Inventor: Charles F. Good, Cincinnati, OH (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 16/046,851

(22) Filed: Jul. 26, 2018

(51) Int. Cl.
*H04L 9/08* (2006.01)
*H04L 29/06* (2006.01)

(52) U.S. Cl.
CPC ............ *H04L 9/0819* (2013.01); *H04L 9/088* (2013.01); *H04L 63/166* (2013.01)

(58) Field of Classification Search
CPC .................................................... H04L 9/0819
See application file for complete search history.

(56) References Cited

U.S. PATENT DOCUMENTS

| | | | |
|---|---|---|---|
| 7,023,854 B2 | 4/2006 | Garfinkel | |
| 7,421,741 B2 * | 9/2008 | Phillips, II | H04L 63/045 380/259 |
| 8,605,629 B1 | 12/2013 | S et al. | |
| 9,510,061 B2 * | 11/2016 | Bonta | H04L 12/1868 |
| 2008/0068252 A1 | 3/2008 | Mehta et al. | |
| 2008/0068253 A1 | 3/2008 | Mehta et al. | |
| 2009/0182668 A1 * | 7/2009 | Lee | H04L 63/0428 705/50 |
| 2017/0118264 A1 * | 4/2017 | Huang | H04L 65/4084 |

* cited by examiner

*Primary Examiner* — William S Powers
(74) *Attorney, Agent, or Firm* — Toler Law Group, PC

(57) ABSTRACT

A method includes detecting, at an interceptor device, a transmission of an encrypted media stream from a first device to a second device. The method also includes intercepting the encrypted media stream, during the transmission, for a simulcast operation associated with the encrypted media stream. The transmission of the encrypted media stream from the first device to the second device is substantially unaffected by the interception. The method further includes simulcasting a version of the encrypted media stream to at least a third device in response to intercepting the encrypted media stream.

20 Claims, 4 Drawing Sheets

MEDIA STREAM INTERCEPTION AND SIMULCAST

FIELD

The present disclosure is generally related to media streaming.

BACKGROUND

A source device, such as a content generator, can generate a media stream that includes different media content. For example, the media stream may include video content, image content, audio content, other content, or a combination thereof. In response to generating the media stream, the source device can transmit the media stream to a first destination device.

However, if multiple destination devices are to receive the media stream, bandwidth inefficiencies and interruptions may occur. For example, the source device may have to send multiple media streams over multiple channels if multiple destination devices are to receive the media stream directly from the source device via simulcast. Sending multiple media streams over multiple channels results in the use of additional bandwidth by the source device. Alternatively, the source device can send a data stream to a media server, and the media server can forward the data stream to multiple destination devices, including the first destination device. However, sending the data stream directly to the media server, as opposed to the first destination, results in latency and potential interruptions.

SUMMARY

Systems and methods of intercepting an encrypted media stream for simulcast are disclosed. The encrypted media stream may include encrypted data that corresponds to media content (e.g., video content, image content, audio content, other content, or a combination thereof). The encrypted media stream is sent from a source device to a destination device via a single communication channel. Additionally, the source device securely sends a set of encryption keys to the destination device. The destination device uses the set of encryption keys to decrypt (e.g., decode) the encrypted media stream and retrieve the media content.

An interception device can intercept the encrypted media stream at an interception point while the encrypted media stream is transmitted from the source device to the destination device. The interception device uses port forwarding techniques or a low-level network service to intercept the encrypted media stream in such a manner that the transmission of the encrypted media stream from the source device to the destination device is not disturbed (e.g., the integrity of the transmission is preserved). For example, the transmission and encryption of the encrypted media stream from the source device to the destination device is substantially maintained (e.g., preserved) as if the encrypted media stream was not intercepted. According to one implementation, the encryption of the encrypted media stream is maintained throughout interception and the transmission time of the transmission from the source device to the destination device is increased by less than three percent. Upon intercepting the encrypted media stream, the interception device simulcasts a version of the encrypted media stream to one or more other devices. In an example, the interception device decrypts the encrypted media stream (or a copy thereof) "on the fly" using the set of encryption keys and can simulcasts a decrypted version of the encrypted media stream to the one or more other devices. As another example, the interception device can re-encrypt the decrypted version of the encrypted media stream using a different set of encryption keys (e.g., that are negotiated with the one or more other devices) and simulcast the re-encrypted version of the media stream to the one or more other devices. Each set of encryption keys can be negotiated using a four-way handshake, a two-way handshake, a group-key handshake, etc.

As a result, latency between the source device and the destination device is improved because the source device sends the encrypted media stream directly to the destination device (as opposed to sending the encrypted media stream to a media server for forwarding). Additionally, the transmission bandwidth used by the source device is reduced because the source device transmits the encrypted media stream to a single destination (using a narrow bandwidth) as opposed to transmitting the encrypted media stream to multiple destinations using a wider bandwidth.

Thus, the systems and methods disclosed herein enable preservation of the transmission of the encrypted media stream between the source device and the destination device (e.g., the original destination device) while also enabling simulcast of the encrypted media stream. For example, the systems and methods disclosed herein use port forwarding to intercept the encrypted media stream in such a manner that the transmission of the encrypted media stream from the source device to the destination device is not disturbed. By intercepting and simulcasting the encrypted media stream at the interception device (as opposed to sending multiple media streams at the source device), the transmission bandwidth associated with the source device is reduced. For example, the source device transmits the encrypted media stream to a single destination (using a narrow bandwidth) as opposed to transmitting the encrypted media stream to multiple destinations using a wider bandwidth. Additionally, by intercepting and simulcasting the encrypted media stream at the interception device (as opposed to sending the media stream to a media server for forwarding), the source device is able to send the encrypted media stream directly to the original destination device for improved latency. For example, by using the interception device to intercept the encrypted media stream for simulcasting to other end devices, the source device is able to send the encrypted media stream directly to the original destination device as opposed to sending the encrypted media stream to a forwarding device that forwards the encrypted media stream to the original destination device. Sending the encrypted media stream directly to the original destination device improves latency.

DETAILED DESCRIPTION

Figure 1:
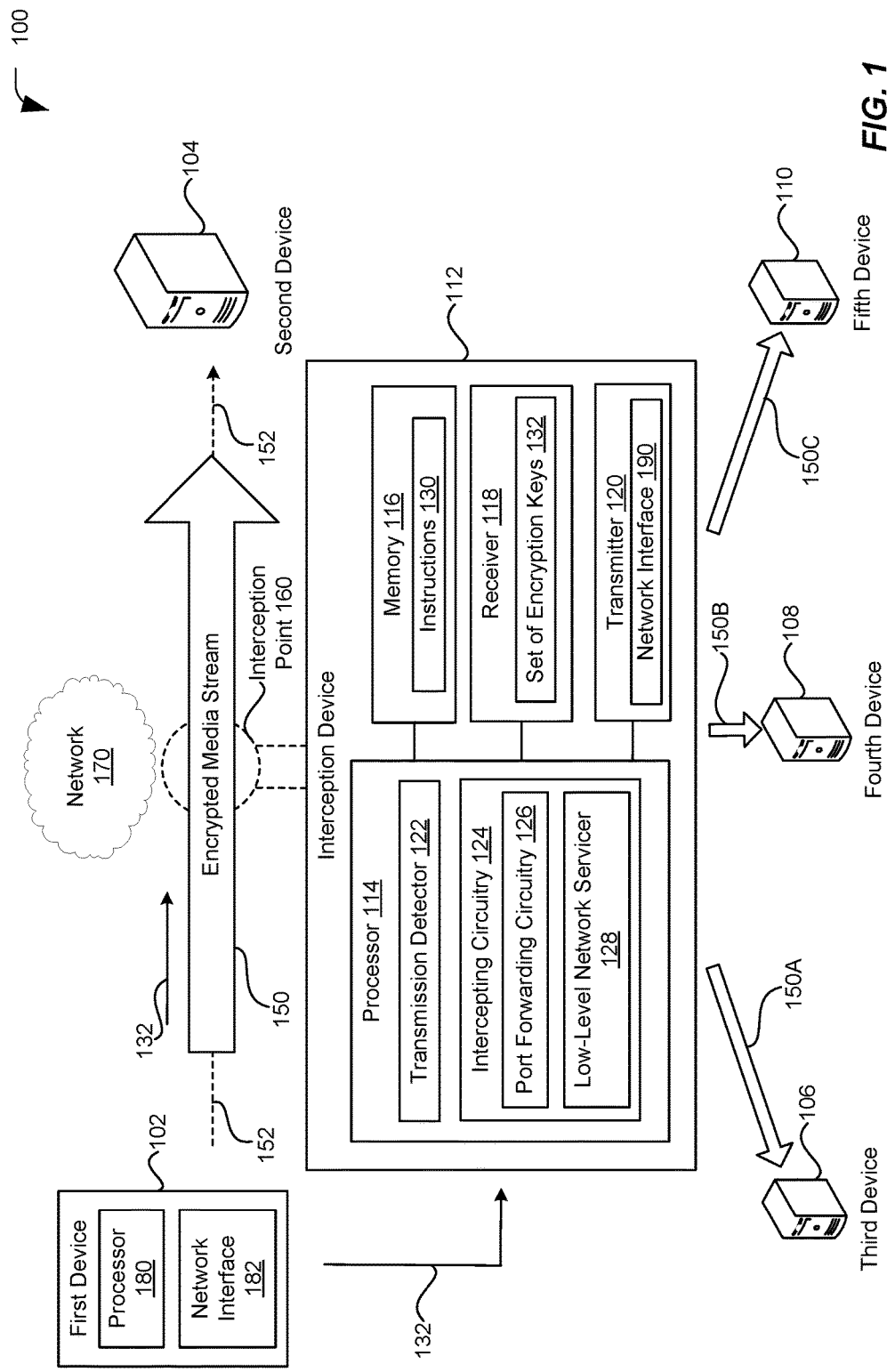
FIG. 1 is a diagram to illustrate a particular implementation of a system that includes an interceptor device that is operable to intercept an encrypted media stream for simulcast.

FIG. 1 is a diagram to illustrate a particular implementation of a system 100 that includes an interceptor device that is operable to intercept an encrypted media stream for simulcast. The system 100 includes a first device 102, a second device 104, a third device 106, a fourth device 108, a fifth device 110, and an interception device 112. Although six devices 102-112 are illustrated in FIG. 1, in other implementations, the system 100 may include fewer devices. As a non-limiting example, in one implementation, the system 100 may include the first device 102, the second device 104, the third device 106, and the interception device 112. In other implementations, the system 100 may include additional devices than the devices illustrated in FIG. 1.

The first device 102 is a first media server that is communicatively coupled to the second device 104. According to one implementation, the second device 104 is a second media sever, such as a social media platform server. According to another implementation, the second device 104 is a destination media device, such as an end user device. Non-limiting examples of an end user device include a mobile phone, a tablet, a laptop, a smart television, etc. The first device 102 is configured to transmit an encrypted media stream 150 to the second device 104. The encrypted media stream 150 includes encrypted data that corresponds to media content (e.g., video content, image content, audio content, other content, or a combination thereof). The first device 102 may encrypt (e.g., encode) the encrypted media stream 150 using a Transport Layer Security (TLS) encryption or a Secure Sockets Layer (SSL) encryption.

The first device 102 is configured to encode, encrypt, or transcode a media stream. The first device 102 may generate media data (e.g., audio, video, and/or text data) to be sent to one or more particular destination devices, including the second device 104. A processor 180 of the first device 102 may perform media processing functions such as format conversion, aspect ratio conversion, bitrate conversion, resolution conversion, color space conversion, etc. An output stream (e.g., the encrypted media stream 150) generated by the first device 102 is transmitted to the second device 104 over a wireless network 170 using a network interface 182. The network interface 182 may be a wired interface or a wireless interface that enables the first device 102 to communicate data via the network 170, such as the Internet. For example, the network interface 182 may include an Ethernet interface, a wireless interface compatible with an Institute of Electrical and Electronics Engineers (IEEE) 802.11 protocol, a BLUETOOTH® interface, or another wired or wireless interface. BLUETOOTH® is a registered trademark owned by BLUETOOTH SIG, INC., a Delaware Corporation. Additionally, the first device 102 securely transmits a set of encryption keys 132 to the second device 104 and to the interception device 112. For example, the processor 180 generates the set of encryption keys 132 using an encryption algorithm for security, and the network interface 182 securely transmits the set of encryption keys 132 to the second device 104 and to the interception device 112.

Upon reception of the encrypted media stream 150, the second device 104 decrypts (e.g., decodes) the encrypted media stream using a set of encryption keys 132 securely provided to the second device 104 from the first device 102. For example, the second device 104 (e.g., a decoder) may process audio, video, and/or text streams that may be provided by first device 102 in a variety of formats. The second device 104 may perform functions such as format conversion, aspect ratio conversion, bitrate conversion, resolution conversion, color space conversion, etc.

Examples of media formats supported by the devices 102, 104 include, but are not limited to, a hypertext transfer protocol (HTTP) live streaming (HLS) format that may be provided to iOS® devices (iOS is a registered trademark of Cisco Systems, Inc. of San Jose, Calif. and is used by Apple Inc. of Cupertino, Calif. under license), a HTTP dynamic streaming (HDS) format that may be provided to a device that is compatible with video for Adobe® Flash® (Adobe and Flash are registered trademarks of Adobe Systems Inc. of San Jose, Calif.), smooth streaming (e.g., an Internet Information Services (IIS) extension from Microsoft Corp. to implement adaptive bitrate streaming and provide media streams to devices running Microsoft® Silverlight® or other smooth streaming clients (Microsoft and Silverlight are registered trademarks of Microsoft Corp. of Redmond, Wash.)), and motion picture experts group (MPEG) dynamic adaptive streaming over HTTP (MPEG-DASH) (also known as international organization for standardization (ISO)/international electrotechnical commission (IEC) 23009-1). Additional audio formats, video formats, data formats and or coder/decoders (CODECs) may also be supported.

Each device 102-110 may include a media device or a media server. As used herein, a "media device" may include an audio device that is configured to playback audio streams, a viewing device that is configured to playback a visual stream, a combination thereof, etc. As used herein, a "media server" may include a device that is configured to stream media (e.g., audio, video, or both) to a media device. Each media server can support multiple coding technologies and protocols. For example, a media server may support video encoding types including, but not limited to, H.264, On2 VP6, Sorenson Spark, Screen video, Screen video 2, motion picture experts group (MPEG) 2 (MPEG-2), MPEG-4 Part 2, and MPEG-4 Part 10. The media servers may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3. The media servers may support communication (e.g., adaptive streaming and non-adaptive streaming) protocols including, but not limited to, HLS, HDS, smooth streaming, and DASH (also known as MPEG-DASH or international organization for standardization (ISO)/international electrotechnical commission (IEC) 23009-1). The media servers may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported. The media communication protocol may support real-time streaming of audio, video, and/or non-audio/non-video (e.g., textual) data. As used herein, the term "media server" may refer to software application(s) that perform media serving or processing, hardware systems (e.g., servers) that support or perform media serving and processing, or any combination thereof. Thus, various operations described with reference to a media server may be implemented using hardware, software (e.g., instructions executable by a processor), or any combination thereof.

The interception device 112 includes a processor 114, a memory 116 coupled to the processor 114, a receiver 118 coupled to the processor 114, and a transmitter 120 (e.g., a simulcast unit) coupled to the processor 114. The processor 114 includes a transmission detector 122 and intercepting circuitry 124. The intercepting circuitry 124 includes port forwarding circuitry 126 and a low-level network servicer 128. The memory 116 is a computer-readable medium that includes instructions 130. The computer-readable medium is not a "signal" but is some form of "storage device." The processor 114 is configured to execute the instructions 130 to perform the operations described herein. Based on the implementation, the transmitter 120 may include a transceiver, a broadcast unit, etc. In a particular implementation, the simulcast unit 120 includes a network interface 190. The network interface 190 may be a wired or a wireless interface that enables the interception device 112 to communicate data via a network, such as the Internet or an IEEE 802.11 network. For example, the network interface 190 may include an Ethernet interface, a universal serial bus (USB) interface, a wireless interface compatible with an Institute of Electrical and Electronics Engineers (IEEE) 802.11 protocol, etc.

During operation, the first device 102 generates a media stream and encrypts the media stream using the set of encryption keys 132 to generate the encrypted media stream 150. As a non-limiting example, the processor 180 can generate the set of encryption keys 132 using symmetric key encryption. As another non-limiting example, the processor 180 can encrypt the media stream using TLS encryption, SSL encryption, or other encryption methods. The first device 102 securely sends the set of encryption keys 132 to the second device 104 and to the interception device 104 over a secure channel. Additionally, the first device 102 sends a transmission 152 to the second device 104 over a communication channel. The encrypted media stream 150 is included in the transmission 152.

The interception device 112 is configured to detect the transmission 152 of the encrypted media stream 150 from the first device 102 to the second device 104. To illustrate, the transmission detector 122 may be configured to scan the communication channel associated with the transmission 152 to detect the transmission 152. For example, the transmission detector 122 may tune to a frequency associated with the communication channel to detect activity on the communication channel. When the transmission 152 is sent to the second device 104 over the particular channel, the transmission detector 122 may detect the transmission 152 based on the scan.

The interception device 112 is also configured to intercept the encrypted media stream 150 in response to detecting the transmission 152. For example, the intercepting circuitry 124 may intercept the encrypted media stream 150 at an interception point 160 while the encrypted media stream 150 is transmitted from the first device 102 to the second device 104. According to one implementation, the port forwarding circuitry 126 intercepts the encrypted media stream 150. For example, the port forwarding circuitry 126 performs port forwarding to redirect a communication request associated with the encrypted media stream 150. To illustrate, the port forwarding circuitry 126 may redirect the communication address from an address and port number associated with the second device 104 to an address and port number associated with the interception device 112 via network address translation.

The port forwarding circuitry 126 may intercept the encrypted media stream 150 in such a manner that transmission of the encrypted media stream 150 to the second device 104 and encryption of the encrypted media stream 150 are maintained (e.g., not disturbed). For example, the port forwarding circuitry 126 reads the packet headers of data packets of the encrypted media stream 150, determines the destination (e.g., the second device 104) of the data packets based on the packet headers, and modifies the destination of the data packets to additionally include a port address of the interception device 112. Thus, the second device 104 receives the encrypted media stream 150, and the interception device 112 receives the encrypted media stream 150. According to another implementation, the low-level network servicer 128 intercepts the encrypted media stream 150. For example, the low-level network servicer 128 can duplicate and route the duplicated copy of the encrypted media stream 150 to the interception device 112.

In response to intercepting the encrypted media stream 150 at the interception point 160, the processor 114 initiates a simulcast of versions 150A, 150B, 150C of the encrypted media stream 150 to at least one of the third device 106, the fourth device 108, or the fifth device 110, respectively. To illustrate, the processor 114 can decrypt the encrypted media stream 150 (or a copy thereof) "on the fly" using the set of encryption keys 132, and the transmitter 120 can simulcast the decrypted version of the encrypted media stream 150 to the other devices 106, 108, 110 as the versions 150A-C of the encrypted media stream 150. As another example, the processor 132 can re-encrypt the decrypted version of the encrypted media stream 150 using different sets of encryption keys, and the transmitter 120 can simulcast the re-encrypted version of the media stream to the other devices 106, 108, 110 as the version 150A of the encrypted media stream 150. In this example, the other sets of encryption keys may have been previously negotiated between the interception device 112 and the other devices 106, 108, 110.

Thus, the processor 114 instructs the transmitter 120 to transmit version(s) of the encrypted media stream 150 to one or more of the other devices 106-110 while the original encrypted media stream 150 is transmitted to the second device 104. In yet another scenario where the encrypted media stream is re-encrypted using different set(s) of encryption keys at the interception device 112, the transmitter 120 may transmit (e.g., simulcast) the different set of encryption keys to one or more of the other devices 106-110 to enable the other devices 106-110 to dynamically decrypt the version 150A of the encrypted media stream 150 (e.g., decrypt the re-encrypted media stream on the fly).

Thus, the system 100 enables preservation of the transmission 152 of the encrypted media stream 152 between the first device 102 and the second device 104 (e.g., the original destination device) while also enabling simulcast of version (s) of the encrypted media stream 150. For example, the interception device 112 uses port forwarding to intercept the encrypted media stream 150 in such a manner that the transmission 152 of the encrypted media stream 150 from the first device 102 to the second device 104 is not disturbed. By intercepting the encrypted media stream 150 and simulcasting version(s) of the encrypted media stream 150 at the interception device 112 (as opposed to sending multiple media streams at the first device 102), the transmission bandwidth associated with the first device 102 is reduced. For example, the first device 102 transmits the encrypted media stream 150 to a single destination (using a narrow bandwidth) as opposed to transmitting the encrypted media stream 150 to multiple destinations using a wider bandwidth. If two encrypted media streams are transmitted directly from the first device 102, both encrypted media streams would compete for bandwidth (e.g., "first mile" bandwidth).

Additionally, by intercepting the encrypted media stream 150 and simulcasting version(s) of the encrypted media stream 150 at the interception device 112 (as opposed to sending the media stream to a media server for forwarding), the first device 102 is able to send the encrypted media stream 150 directly to the second device 104 device, which improves latency. For example, by using the interception device 112 to intercept the encrypted media stream 150 for simulcasting to other end devices 106-110, the first device 102 is able to send the encrypted media stream 150 directly to the original destination device (e.g., the second device 104) as opposed to sending the encrypted media stream 150 to a forwarding device that forwards the encrypted media stream 150 to the original destination device. Sending the encrypted media stream 150 directly to the original destination device improves latency. In addition, if the first device 112 transmits the encrypted media stream 150 to a central media server (not shown), and the central media server splits and forwards the encrypted media stream 150 to the other devices 104-110, there may be network delays between the first device 112 and the central media server when adjusting the bitrate of the forwarded media streams.

Figure 2:
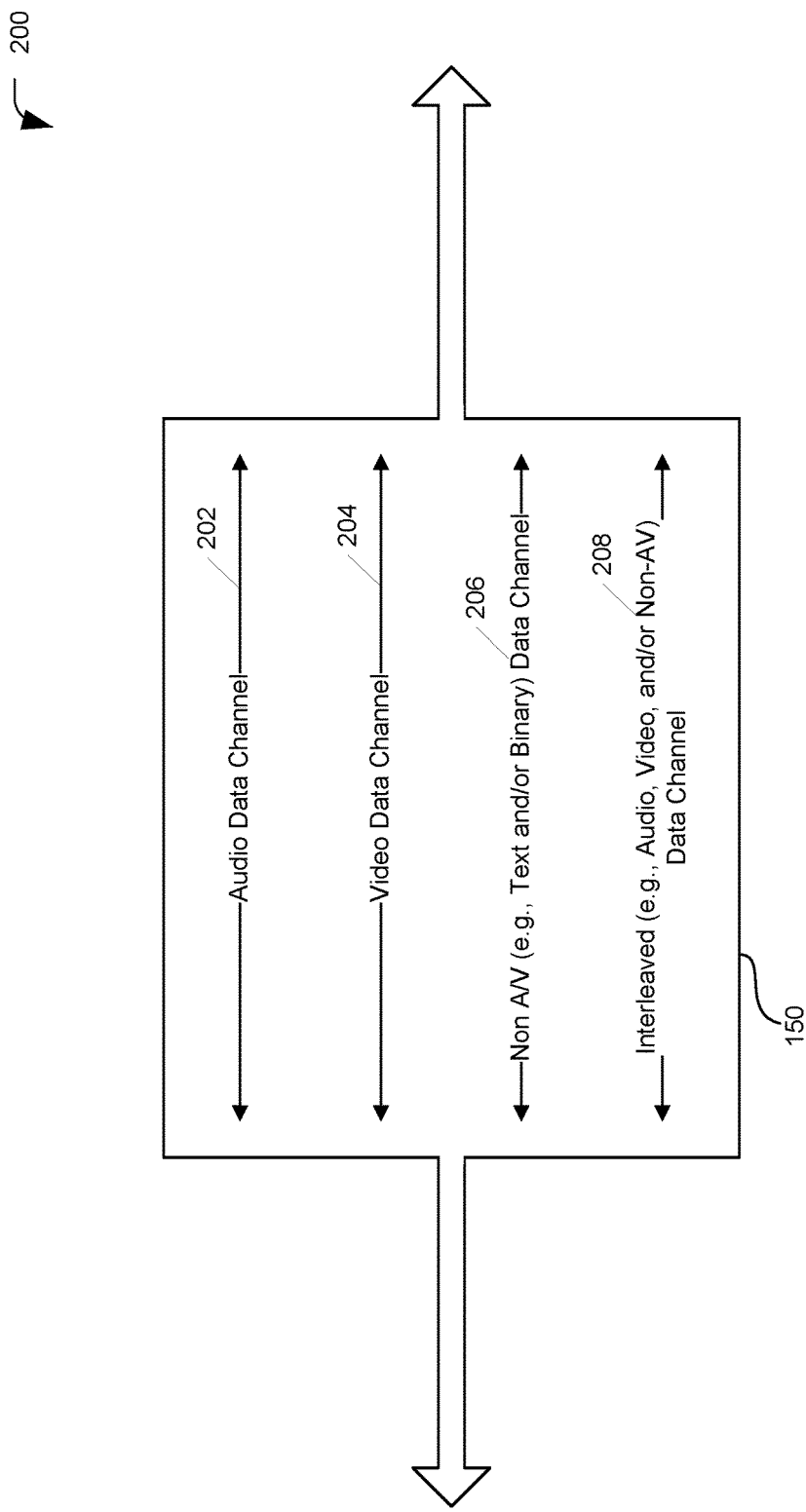
FIG. 2 is a diagram to illustrate a particular example of the encrypted media stream of FIG. 1.

FIG. 2 is a diagram to illustrate a particular implementation of the encrypted media stream 150. The encrypted media stream 150 may include one or more channels. For example, the encrypted media stream 150 may include an audio data channel 202 that carries only audio data, a video data channel 204 that carries only video data, and a non A/V channel 206 that carries one or more other kinds of data (e.g., text data and/or binary data). Alternately, or in addition, the encrypted media stream 150 may include one or more interleaved channels 208 that interleave different kinds of data.

It should be noted that other types of data may also be communicated via the encrypted media stream 150. For example, a first device 102 may use the encrypted media stream 150 to send a remote procedure call (RPC) to the second device 104 to trigger an operation (e.g., procedure call) at the second device 104. For example, during a live video stream of a reality television show, the first device 102 may send a remote procedure call to the second device 104 (e.g., a viewing device) to cause the second device 104 to display an overlay that enables a viewer to vote for contestants on the reality television show. Upon interception and simulcasting of the encrypted media stream 150 to the other devices 106-110, the other devices 104 can also display an overlay that enables viewer to vote for contestants on the reality television show.

Figure 3:
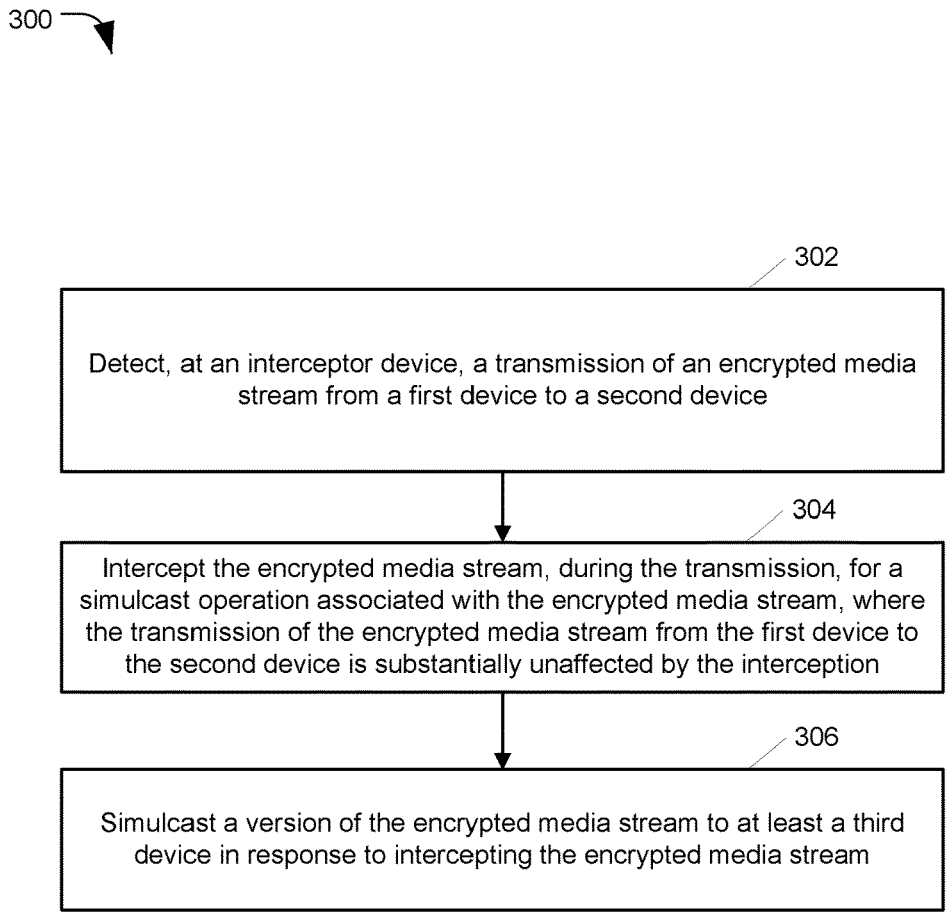
FIG. 3 is a flowchart to illustrate a particular implementation of a method for intercepting an encrypted media stream for simulcast.

FIG. 3 is a flowchart to illustrate a particular implementation of a method 300 for intercepting an encrypted media stream for simulcast. In an illustrative implementation, the method 300 may be performed by the interception device 112 of FIG. 1.

The method 300 includes detecting, at an interceptor device, a transmission of an encrypted media stream from a first device to a second device, at 302. For example, referring to FIG. 1, the interception device 112 detects the transmission 152 of the encrypted media stream 150 from the first device 102 to the second device 104. To illustrate, the transmission detector 122 of the interception device 112 scans the communication channel associated with the transmission 152 for activity to detect the transmission 152. When the transmission 152 is sent to the second device 104 over the communication channel, the transmission detector 122 detects the transmission 152 based on the scan.

The method 300 also includes intercepting the encrypted media stream, during the transmission, for a simulcast operation associated with the encrypted media stream, at 304. The transmission of the encrypted media stream from the first device to the second device is substantially unaffected by the interception. For example, referring to FIG. 1, the port forwarding circuitry 126 may intercept the encrypted media stream 150 in such a manner that transmission 152 of the encrypted media stream 150 to the second device 104 and encryption of the encrypted media stream 150 are maintained (e.g., not disturbed). According to one implementation, the encryption of the encrypted media stream 150 is maintained throughout the interception and the transmission time of the transmission 152 from the first device 102 to the second device 104 is increased by less than three percent.

In a particular application, the port forwarding circuitry 126 reads the packet headers of data packets of the encrypted media stream 150, determines the destination (e.g., the second device 104) of the data packets based on the packet headers, and modifies the destination of the data packets to additionally include port addresses of at least one of the interception device 112, the third device 106, the fourth device 108, or the fifth device 110. Thus, the port forwarding circuitry 126 performs port forwarding to redirect a communication request associated with the encrypted media stream 150. To illustrate, the port forwarding circuitry may redirect the communication address from an address and port number associated with the second device 104 to an address and port number associated with the interception device 112 via network address translation. The port forwarding circuitry 126 intercepts the encrypted media stream 150 in such a manner that transmission of the encrypted media stream 150 to the second device 104 and encryption of the encrypted media stream 150 are maintained (e.g., not disturbed).

In another particular application, the low-level network servicer 128 of the interception device 112 can intercept the encrypted media stream 150 at a network level. For example, the low-level network servicer 128 can intercept the packets of the encrypted media stream 150, copy the intercepted packets for simulcast, and retransmit the intercepted packets to the second device 104.

The method 300 also includes simulcasting a version of the encrypted media stream to at least a third device in response to intercepting the encrypted media stream, at 306. For example, referring to FIG. 1, the processor 114 initiates a simulcast of versions 150A, 150B, or 150C of the encrypted media stream 150 to at least one of the third device 106, the fourth device 108, or the fifth device 110, respectively. The processor 114 can decrypt the encrypted media stream 150 (or a copy thereof) "on the fly" using the set of encryption keys 132, and the transmitter 120 can simulcast the decrypted version of the encrypted media stream 150 to the other devices 106, 108, 110 as the versions 150A-C of the encrypted media stream 150. As another example, the processor 132 can re-encrypt the decrypted version of the encrypted media stream 150 using different sets of encryption keys, and the transmitter 120 can simulcast the re-encrypted version of the media stream to the other devices 106, 108, 110 as the version 150A of the encrypted media stream 150. Thus, the processor 114 instructs the transmitter 120 to transmit the encrypted media stream 150 to one or more of the other devices 106-110 while the original encrypted media stream 150 is transmitted to the second device 104. In yet another scenario where the encrypted media stream is re-encrypted using different sets of encryption keys at the interception device 112, the transmitter 120 may also transmit (e.g., simulcast) the different set of encryption keys to one or more of the other devices 106-110 to enable the other devices 106-110 to dynamically decrypt the re-encrypted media stream.

The method 300 of FIG. 3 enables preservation of the transmission 152 of the encrypted media stream 152 between the first device 102 and the second device 104 (e.g., the original destination device) while also enabling simulcast of a version 150A of the encrypted media stream 150. For example, the interception device 112 uses port forwarding to intercept the encrypted media stream 150 in such a manner that the transmission 152 of the encrypted media stream 150 from the first device 102 to the second device 104 is not disturbed. By intercepting the encrypted media stream 150 and simulcasting versions 150A-150C of the encrypted media stream 150 at the interception device 112 (as opposed to sending multiple media streams at the first device 102), the transmission bandwidth associated with the first device 102 is reduced. For example, the first device 102 transmits the encrypted media stream 150 to a single destination (using a narrow bandwidth) as opposed to transmitting the encrypted media stream 150 to multiple destinations using a wider bandwidth. Additionally, by intercepting the encrypted media stream 150 and simulcasting versions 150A-C of the encrypted media stream 150 at the interception device 112 (as opposed to sending the media stream to a media server for forwarding), the first device 102 is able to send the encrypted media stream 150 directly to the second device 104 device, which improves latency. For example, by using the interception device 112 to intercept the encrypted media stream 150 for simulcasting to other end devices 106-110, the first device 102 is able to send the encrypted media stream 150 directly to the original destination device (e.g., the second device 104) as opposed to sending the encrypted media stream 150 to a forwarding device that forwards the encrypted media stream 150 to the original destination device. Sending the encrypted media stream 150 directly to the original destination device improves latency.

Figure 4:
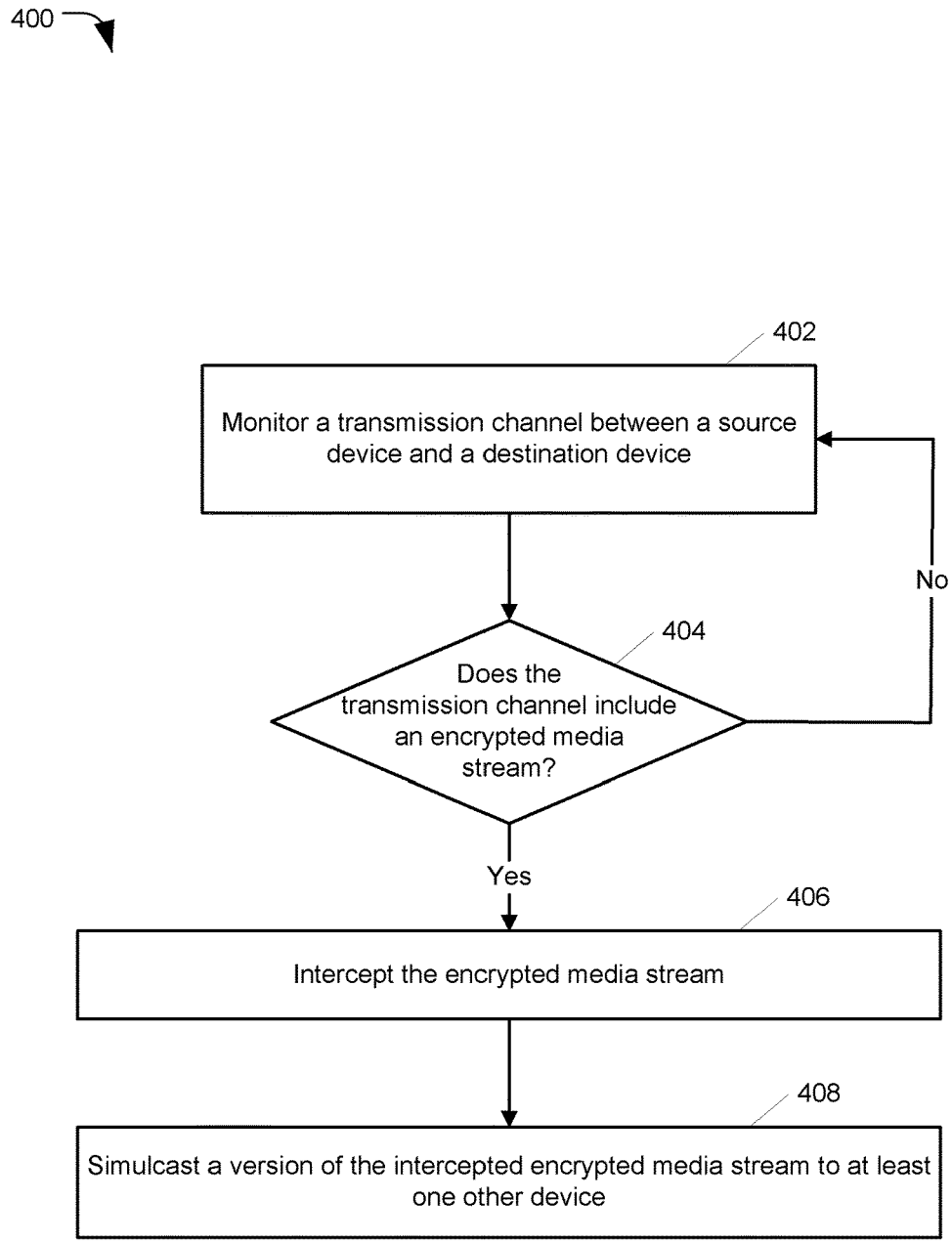
FIG. 4 is a flowchart to illustrate a particular implementation of another method for intercepting an encrypted media stream for simulcast.

FIG. 4 is a flowchart to illustrate a particular implementation of another method 400 for intercepting an encrypted media stream for simulcast. In an illustrative implementation, the method 400 may be performed by the interception device 112 of FIG. 1.

At 402, a transmission channel between a source device and a destination device is monitored. For example, referring to FIG. 1, the transmission detector 122 monitors one or more channels for encrypted media streams. According to one implementation, the transmission detector 122 monitors transmission activity on a single channel to detect the encrypted media stream 150. According to another implementation, the transmission detector 122 scans multiple channels to detect the encrypted media stream 150.

At 404, the method 400 includes determining whether the transmission channel includes an encrypted media stream. If the transmission detector 122 determines that the transmission channel does not include the encrypted media stream 150, the method 400 returns to 402. However, if the transmission detector 122 determines that the transmission channel includes the encrypted media stream 150, the method 400 proceeds to 406.

At 406, the encrypted media stream is intercepted. For example, referring to FIG. 1, the interception device 112 intercepts the encrypted media stream 150 in response to detecting the transmission 152. To illustrate, the intercepting circuitry 124 of the interception device 112 intercepts the encrypted media stream 150 at the interception point 160 while the encrypted media stream 150 is transmitted from the first device 102 to the second device 104. According to one implementation, the port forwarding circuitry 126 intercepts the encrypted media stream 150. For example, the port forwarding circuitry 126 performs port forwarding to redirect a communication request associated with the encrypted media stream 150. To illustrate, the port forwarding circuitry may redirect the communication address from an address and port number associated with the second device 104 to an address and port number associated with the interception device 112 via network address translation. The port forwarding circuitry 126 intercepts the encrypted media stream 150 in such a manner that transmission of the encrypted media stream 150 to the second device 104 and encryption of the encrypted media stream 150 are maintained (e.g., not disturbed). According to another implementation, the low-level network servicer 128 intercepts the encrypted media stream 150.

At 408, a version of the intercepted encrypted media stream is simulcast to at least one other device. For example, referring to FIG. 1, the processor 114 initiates a simulcast of versions 150A, 150B, 150C of the encrypted media stream 150 to at least one of the third device 106, the fourth device 108, or the fifth device 110, respectively. To illustrate, the processor 114 instructs the transmitter 120 to transmit versions 150A-C of the encrypted media stream 150 to one or more of the other devices 106-110 while the original encrypted media stream 150 is transmitted to the second device 104.

The method 400 of FIG. 4 enables preservation of the transmission 152 of the encrypted media stream 152 between the first device 102 and the second device 104 (e.g., the original destination device) while also enabling simulcast of versions 150A-C of the encrypted media stream 150. For example, the interception device 112 uses port forwarding to intercept the encrypted media stream 150 in such a manner that the transmission 152 of the encrypted media stream 150 from the first device 102 to the second device 104 is not disturbed. By intercepting the encrypted media stream 150 and simulcasting versions 150A-C of the encrypted media stream 150 at the interception device 112 (as opposed to sending multiple media streams at the first device 102), the transmission bandwidth associated with the first device 102 is reduced. For example, the first device 102 transmits the encrypted media stream 150 to a single destination (using a narrow bandwidth) as opposed to transmitting the encrypted media stream 150 to multiple destinations using a wider bandwidth. Additionally, by intercepting the encrypted media stream 150 and simulcasting versions 150A-C of the encrypted media stream 150 at the interception device 112 (as opposed to sending the media stream to a media server for forwarding), the first device 102 is able to send the encrypted media stream 150 directly to the second device 104 device, which improves latency. For example, by using the interception device 112 to intercept the encrypted media stream 150 for simulcasting to other end devices 106-110, the first device 102 is able to send the encrypted media stream 150 directly to the original destination device (e.g., the second device 104) as opposed to sending the encrypted media stream 150 to a forwarding device that forwards the encrypted media stream 150 to the original destination device. Sending the encrypted media stream 150 directly to the original destination device improves latency.

In accordance with various implementations of the present disclosure, one or more methods, functions, and modules described herein may be implemented by software programs executable by a computer system. Further, in an implementation, implementations can include distributed processing, component/object distributed processing, and/or parallel processing. In an implementation, virtual computer system processing can be constructed to implement one or more of the methods or functionality as described herein.

Particular implementations can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the first device 102, the second device 104, the third device 106, the fourth device 108, the fifth device 110, the interception device 112, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular implementation, the instructions can be embodied in a non-transitory computer-readable or processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage medium or device.

According to one implementation of the techniques described herein, an interceptor device includes a memory and a processor coupled to the memory. The processor is configured to detect a transmission of an encrypted media stream from a first device to a second device. The processor is also configured to initiate interception of the encrypted media stream, during the transmission, for a simulcast operation associated with the encrypted media stream. The transmission of the encrypted media stream from the first device to the second device is substantially unaffected by the interception. The interceptor device also includes a transmitter coupled to the processor. The transmitter is configured to simulcast a version of the encrypted media stream to at least a third device in response to intercepting the encrypted media stream.

According to another implementation of the techniques described herein, a method includes detecting, at an interceptor device, a transmission of an encrypted media stream from a first device to a second device. The method also includes intercepting the encrypted media stream, during the transmission, for a simulcast operation associated with the encrypted media stream. The transmission of the encrypted media stream from the first device to the second device is substantially unaffected by the interception. The method further includes simulcasting a version of the encrypted media stream to at least a third device in response to intercepting the encrypted media stream.

According to another implementation of the techniques described herein, a non-transitory computer-readable medium includes instructions that, when executed by a processor at an interceptor device, cause the processor to perform operations including detecting a transmission of an encrypted media stream from a first device to a second device. The operations also include initiating interception of the encrypted media stream, during the transmission, for a simulcast operation associated with the encrypted media stream. The transmission of the encrypted media stream from the first device to the second device is substantially unaffected by the interception. The operations further include initiating a simulcast of a version of the encrypted media stream to at least a third device in response to intercepting the encrypted media stream.

The illustrations of the implementations described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Accordingly, the disclosure and the figures are to be regarded as illustrative rather than restrictive.

Although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations.

The above-disclosed subject matter is to be considered illustrative, and not restrictive, and the appended claims are intended to cover all such modifications, enhancements, and other implementations, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An interceptor device comprising:
   a memory;

a processor coupled to the memory, the processor configured to:
  detect a transmission of a media stream from a first device to a second device; and
  initiate interception of the media stream, during the transmission, with respect to a simulcast operation associated with the media stream, wherein the transmission of the media stream from the first device to the second device is substantially unaffected by the interception; and
a transmitter coupled to the processor, the transmitter configured to simulcast a version of the media stream to at least a third device in response to intercepting the media stream.

2. The interceptor device of claim 1, wherein the processor is further configured to receive, from the first device, a set of encryption keys associated with the media stream.

3. The interceptor device of claim 2, wherein the processor is further configured to:
  decrypt the media stream using the set of encryption keys to generate a decrypted media stream; and
  encrypt the decrypted media stream using a different set of encryption keys to generate a re-encrypted media stream, the re-encrypted media stream corresponding to the version of the media stream.

4. The interceptor device of claim 2, wherein the processor is further configured to decrypt the media stream using the set of encryption keys to generate a decrypted media stream, the decrypted media stream corresponding to the version of the media stream.

5. The interceptor device of claim 1, wherein the media stream is encrypted using a Secure Sockets Layer (SSL) encryption or a Transport Layer Security (TLS) encryption.

6. The interceptor device of claim 1, further comprising port forwarding circuitry integrated into the processor, the port forwarding circuitry configured to intercept the media stream.

7. The interceptor device of claim 1, further comprising a low-level network servicer integrated into the processor, the low-level network servicer configured to intercept the media stream.

8. The interceptor device of claim 1, wherein the first device comprises a first media server, and wherein the second device comprises a second media server.

9. The interceptor device of claim 1, wherein the second media server is a social media platform server.

10. A method comprising:
  detecting, at an interceptor device, a transmission of a media stream from a first device to a second device;
  intercepting the media stream, during the transmission, for a simulcast operation associated with the media stream, wherein the transmission of the media stream from the first device to the second device is substantially unaffected by the interception; and
  simulcasting a version of the media stream to at least a third device in response to intercepting the media stream.

11. The method of claim 10, further comprising receiving, from the first device, a set of encryption keys associated with the media stream.

12. The method of claim 11, further comprising:
  decrypting the media stream using the set of encryption keys to generate a decrypted media stream; and
  encrypting the decrypted media stream using a different set of encryption keys to generate a re-encrypted media stream, the re-encrypted media stream corresponding to the version of the media stream.

13. The method of claim 11, further comprising decrypting the media stream using the set of encryption keys to generate a decrypted media stream, the decrypted media stream corresponding to the version of the media stream.

14. The method of claim 10, wherein the media stream is encrypted using a Secure Sockets Layer (SSL) encryption or a Transport Layer Security (TLS) encryption.

15. The method of claim 10, wherein the media stream is intercepted using port forwarding.

16. The method of claim 10, wherein the media stream is intercepted using a low-level network service.

17. A non-transitory computer-readable medium comprising instructions that, when executed by a processor at an interceptor device, cause the processor to perform operations comprising:
  detecting a transmission of a media stream from a first device to a second device;
  initiating interception of the media stream, during the transmission, for a simulcast operation associated with the media stream, wherein the transmission of the media stream from the first device to the second device is substantially unaffected by the interception; and
  initiating a simulcast of a version of the media stream to at least a third device in response to intercepting the media stream.

18. The non-transitory computer-readable medium of claim 17, wherein the operations further comprise receiving, from the first device, a set of encryption keys associated with the media stream.

19. The non-transitory computer-readable medium of claim 18, wherein the operations further comprise:
  decrypting the media stream using the set of encryption keys to generate a decrypted media stream; and
  encrypting the decrypted media stream using a different set of encryption keys to generate a re-encrypted media stream, the re-encrypted media stream corresponding to the version of the media stream.

20. The non-transitory computer-readable medium of claim 18, wherein the operations further comprise decrypting the media stream using the set of encryption keys to generate a decrypted media stream, the decrypted media stream corresponding to the version of the media stream.

* * * * *